(12) United States Patent
Schnatz

(10) Patent No.: US 7,161,967 B2
(45) Date of Patent: Jan. 9, 2007

(54) METHOD FOR CHECKING THE REGULATION STATE OF A FREQUENCY-STABILIZED LASER SYSTEM AND FREQUENCY-STABILIZED LASER SYSTEM

(75) Inventor: Harald Schnatz, Wendeburg (DE)

(73) Assignee: Bundesrepublik Deutschland, Vertreten Durch das Bundesminsterium fur Wirtschaft und Arbeit, Dieses Vertreten Durch den Prasidenten der Physikalisch-Technischen Bundesanstalt, Braunschweig (DE)

( * ) Notice: Subject to any disclaimer, the term of this patent is extended or adjusted under 35 U.S.C. 154(b) by 163 days.

(21) Appl. No.: 10/470,894

(22) PCT Filed: Feb. 4, 2002

(86) PCT No.: PCT/DE02/00398

§ 371 (c)(1),
(2), (4) Date: Mar. 24, 2004

(87) PCT Pub. No.: WO02/067389

PCT Pub. Date: Aug. 29, 2002

(65) Prior Publication Data

US 2004/0151220 A1    Aug. 5, 2004

(30) Foreign Application Priority Data

Feb. 7, 2001    (DE) ................. 101 05 840

(51) Int. Cl.
*H01S 3/13*    (2006.01)
(52) U.S. Cl. ......................................... 372/32
(58) Field of Classification Search .................. 372/32
See application file for complete search history.

(56) References Cited

U.S. PATENT DOCUMENTS 4,590,597 A * 5/1986 Long-sheng et al. .......... 372/32
4,765,736 A    8/1988 Gallagher et al. ........... 356/256
5,068,864 A * 11/1991 Javan .......................... 372/32
5,295,146 A * 3/1994 Gavrilovic et al. ........... 372/41

FOREIGN PATENT DOCUMENTS

JP    2000-151000    5/2000

OTHER PUBLICATIONS

Galzerano et al., "High-frequency-stability diode-pumped Nd:YAG lasers with the FM sidebands method and Dopler-free iodine lines at 532 nm"; Applied Optics, vol. 38, No. 33, Nov. 20, 1999; pp. 6962-6966.

(Continued)

*Primary Examiner*—Minsun Oh Harvey
*Assistant Examiner*—Rory Finneren
(74) *Attorney, Agent, or Firm*—Whitham, Curtis, Christofferson & Cook, PC

(57) ABSTRACT

The invention relates to a method for checking the regulation state of a frequency-stabilised laser system comprising a laser (2). At least one first sidebrand frequency VHF is modulated to the laser beam (1) of said laser, the laser beam being guided through an absorption material (13) comprising a plurality of absorption lines in a detuning region of the laser (2), said absorption lines being arranged at different distances from each other. The laser frequency $V_L$ is detuned and, as a regulation signal for the laser frequency $V_L$, it is determined whether there has been an absorption in the absorption material. The inventive method is characterised in that a second sidebrand frequency $V_{FG}$ is modulated to the laser beam (1), said frequency being at a known distance defined by a frequency generator (29) in relation to the laser frequency $V_O$; in that the absorption of the second sidebrand frequency $V_O+V_{FG}$ in the absorption material is checked at least from time to time; and in that when no absorption is observed for the second sidebrand frequency, the laser frequency $V_L$ is detuned until an absorption of both the laser frequency VO and the second sidebrand frequency $V_O+V_{FG}$ is observed.

6 Claims, 3 Drawing Sheets

OTHER PUBLICATIONS

Figure 1:
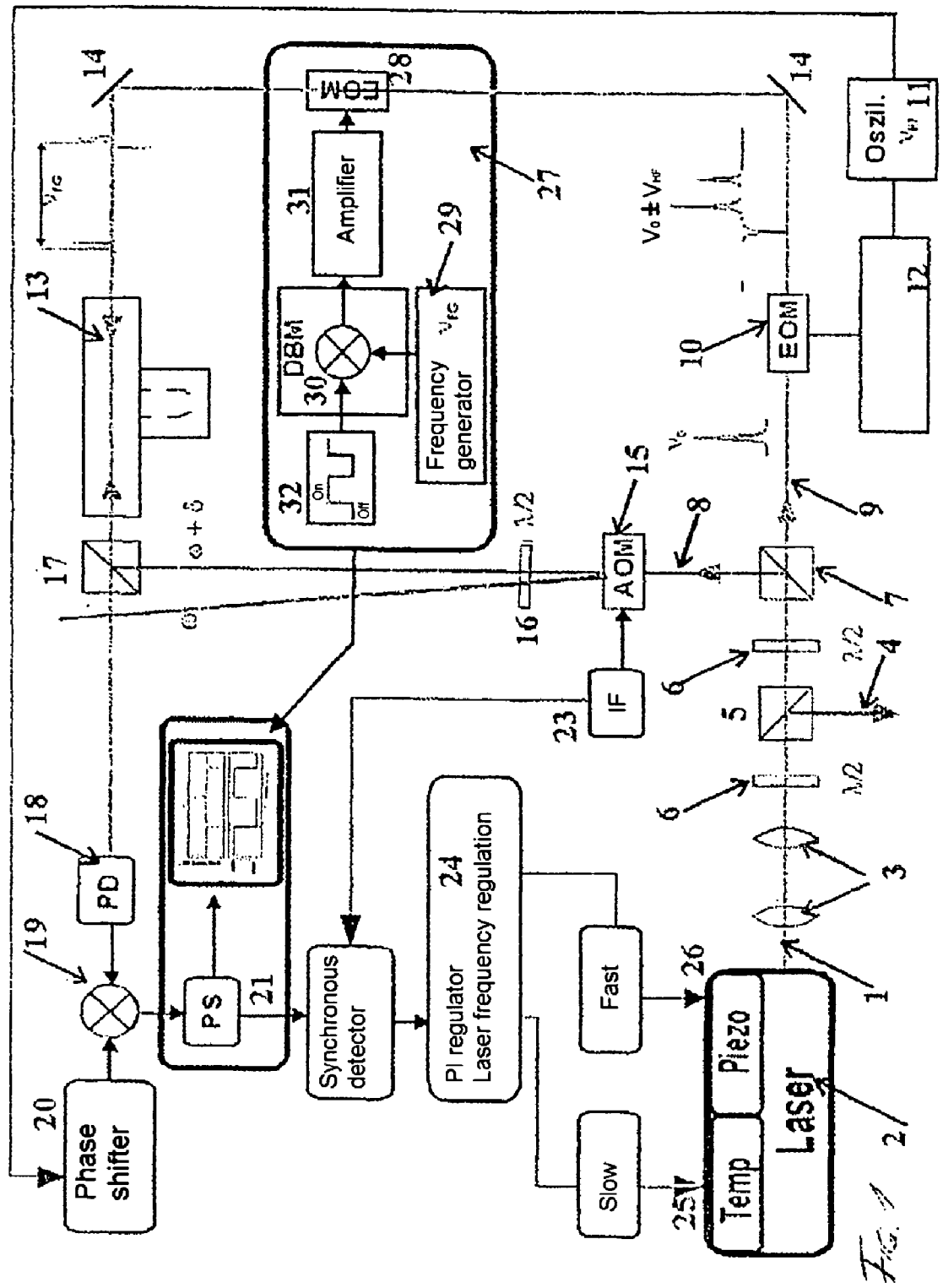

Bjorklund; "Frequency-modulation spectroscopy: a new method for measuring weak absorptions and dispersions"; Optic Letters, vol. 5, No. 1; Jan. 1980; pp. 15-17.

Hall et al.; "Optical heterodyne saturation spectroscopy"; Applied Physics Letters, vol. 39, No. 9, Nov. 1981; pp. 680-682.

Gilzerano et al.; "Frequency stabilization of Frequency-Doubled Nd: YAG Lasers at 532 nm by frequency modulation spectroscopy technique"; Transactions on Instrumentation & Measurement, vol. 48, No. 2, Apr. 1999; pp. 540-543.

Musha et al.; "The short- and long-term frequency stabilization of an injection-locked Nd: YAG laser in reference to a Fabry-Perot cavity and an iodine saturated absorption line"; Optics Communications, 183, 2000; pp. 165-173.

Ye et al.; "High-resolution frequency standard at 1030 nm for Yb: YAG solid-state lasers"; Optical Society of America, vol. 17, No. 6, Jun. 2000; pp. 927-931.

Cheng et al.; "Frequency stabilization and measurements of 543 nm HeNe lasers"; Optical and Quantum Electronics 32, 2000; pp. 299-311.

Article titled: Modulation transfer processes in optical heterodyne saturation spectroscopy; dated Jul. 1992; by Jon H. Shirley.

Article from the Journal of Physics titled: Frequency stabilization of the helium-neon laser by saturated absorrption in iodine vapour; date 1971 by K.A. Stetson & P.A. Taylor.

Article from the IEEE Journal vol. 28 No. 11 titled: Optical Heteodyne Spectroscopy Enhanced by an External Optical Cavity: Toward Improved Working Standards; by MA Long-Sheng and J.L. Hall.

* cited by examiner

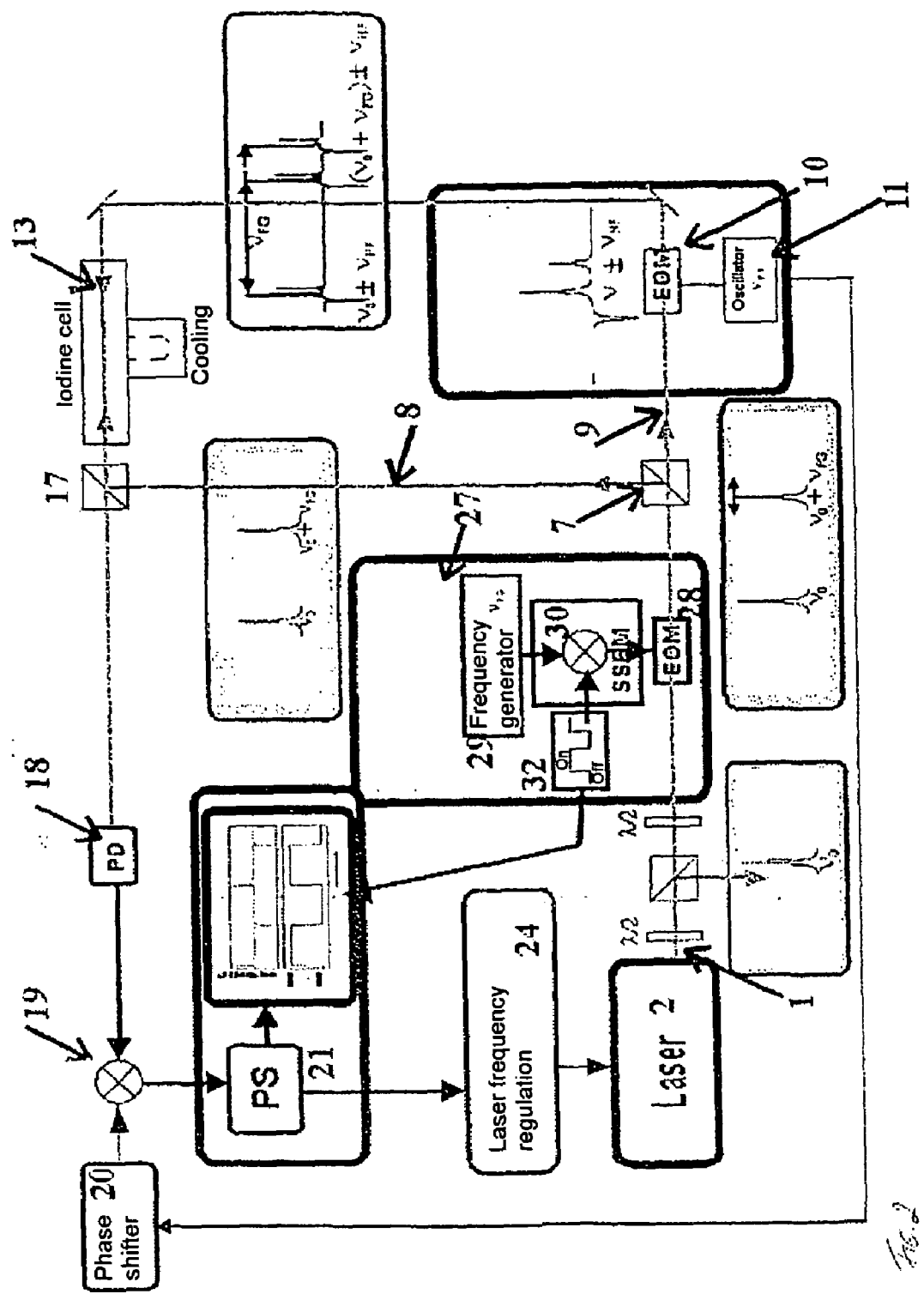

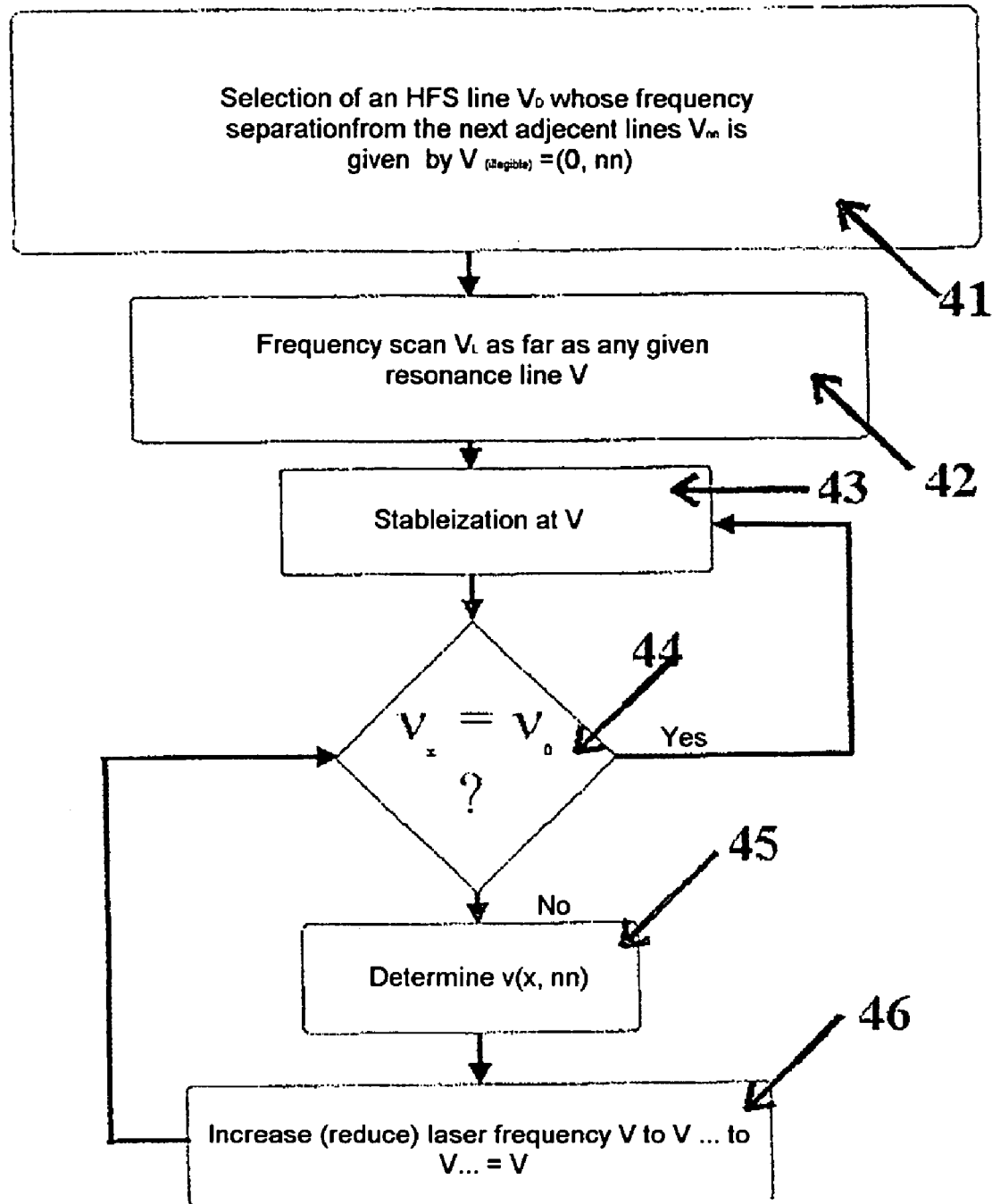

METHOD FOR CHECKING THE REGULATION STATE OF A FREQUENCY-STABILIZED LASER SYSTEM AND FREQUENCY-STABILIZED LASER SYSTEM

The invention relates to a method for checking the regulation state of a frequency-stabilized laser arrangement having a laser whose laser beam is modulated at at least one first sideband frequency and is passed through an absorption material which has two or more absorption lines in a tuning range of the laser, which are arranged at different separations from one another, with the laser frequency being tuned and being detected as a regulation signal for the laser frequency to determine whether any absorption has taken place in the absorption material.

The invention also relates to a frequency-stabilized laser arrangement having a laser whose laser beam has at least one first sideband frequency which is produced by means of a first modulation device with respect to a laser frequency and passes through an absorption material which has two or more absorption lines in a tuning range of the laser, which absorption lines are arranged with different separations between them, having a tuning device for tuning the laser frequency over the tuning range, and having an evaluation device for identification of absorption in the absorption material and for regulation of the laser at an absorption line.

Precise reference frequencies are required for numerous applications and, in particular for length and frequency measurements, optical communication and precision spectrometry, are normally provided by lasers which are stabilized at suitable absorption lines.

The development of laser sources which are suitable for this purpose depends on the availability of the reference lines in atoms, ions or molecules. While atomic or ionic transitions generally allow unique association, the complicated structure of the molecules results in a large number of possible transitions, which can all be used for stabilization. In the majority of applications, one specific line is chosen from the broad spectrum of possible absorption lines for stabilization of the laser, with the atomic or molecular transition frequency of this specific line being known exactly.

Application examples are:
- an iodine-stabilization HeNe laser, which has been widely used in research and technology since it can be controlled easily and is reliable,
- commercially available Nd:YAG lasers at twice the frequency and at a wavelength of $\lambda=532$ nm which can likewise be iodine-stabilized since the very strong absorption lines of $I_2$ molecules in the vicinity of 532 nm represent an ideal frequency grating for stabilization,
- $C_2H_2$-stabilized diode lasers for use in telecommunications bands,
- $CH_4$-stabilized HeNe lasers at 3.3 µm,
- $OsO_4$-stabilized $CO_2$ lasers at 10 µm.

The frequency stabilization is in this case based on the fact that the laser beam is absorbed by the absorption material. This absorption can be detected and can be used as a regulation signal for the laser frequency. The laser can be tuned in a known manner as a function of the laser type by acting in the laser resonator by means of a temperature change, etc.

Ingenius stabilization methods and arrangements use phase modulation spectroscopy methods (Bjorklund, Opt. Lett., 1980, 5, 15; Hall, Hollberg, Baer, Robinson, Appl. Phys. Lett., 39, 680 (1981)), modulation transfer spectroscopy methods (Shirley, Optics Lett. 7, 537–539 (1982), Ma, Hall, IEEE J. Quant. Electr., 26, 2006 (1990)), or saturation spectroscopy methods with detection of the third harmonics (Wallard, J. Phys. E5, 926 (1972)).

All the methods have the common feature that the laser beam is passed through a cell which is filled with the absorption material and causes the relevant transition from one electron state to the other for the relevant absorption line.

In the case of phase modulation spectroscopy, a pump beam which causes this transition is produced and is passed through the cell with the absorption material. The absorption which takes place is verified by means of a phase-modulated analysis beam in the opposite direction. Sidebands having the same separation as the modulation frequency are applied to the analysis beam by means of an electrooptical modulator (EOM). The beating between the two sidebands and the carrier results in two signals at the modulation frequency at a photodetector which detects the analysis beam after it has passed through the absorption material. Without any resonance in the absorption in the absorption material, these two signals (which have a phase difference of 180° between them) interfere, so that they cancel one another out. However, if the interaction with the absorption material results in one of the two sidebands experiencing absorption and dispersion, then this results in absorption and phase shift, which cancels out the balance in the beat signals. This results in a detector signal which contains two components, that is to say a dispersion signal in phase with the applied modulation frequency and an absorption signal which is phase-shifted through 90°.

The dispersion signal now contains only a low background level and is thus used as a discriminator signal for frequency regulation. In order to reduce the background level further, the absorption of the pump beam is periodically modulated, and the FM signal is detected on a phase-sensitive basis.

In this method, the modulation frequency is chosen to be high in comparison to the spectral width of the structure being investigated. Furthermore, the catchment range for stabilization is governed by the modulation frequency. Modulation frequencies above the relaxation oscillations of the lasers that are used are expedient since, in this case, the low technical noise level from the lasers allows high sensitivity, the catchment range is sufficiently wide, and frequency shifts resulting from contributions from adjacent hyperfine lines are still low.

Modulation transfer spectroscopy is based on the transfer of the modulation of the pump beam to the unmodulated analysis beam by modulated hole-burning and reflection on an induced population density grating. This process can be described in the context of 4-wave mixing. The carrier of the frequency-modulated beam and of one of its sidebands are coupled via the nonlinear third-order susceptibility of the medium to the unmodulated laser beam arriving in the opposite direction. The pump beam burns holes at the separation of the modulation frequency around the carrier with a modulated depth into the velocity distribution of the population density of the basic state. The population density thus oscillates at the modulation frequency. The unmodulated beam thus experiences absorption and dispersion which vary with the modulation frequency, which corresponds to frequency modulation of the previously unmodulated test beam. A narrowband photodetector detects the analysis beam. The phase information is converted to baseband by means of a double-balanced mixer and is supplied as a regulation signal to a PI regulator. One precondition for this method is that the absorption material can follow the modulation sufficiently quickly. Modulation frequencies are therefore used which correspond approximately to half the line width of the transition (several 100 kHz).

The advantage of this method is that it is less sensitive to residual amplitude modulation in the EOM, since the analysis beam is modulated by the modulation transfer only in the event of resonance. In particular, this affects the long-term stability.

In the case of saturation spectroscopy, a modulated laser beam is passed through the absorption material and, after passing through a $\lambda/4$ cell, is then reflected as a reflected beam and is passed through the absorption material in the opposite direction.

Phase-sensitive demodulation of the nth harmonics of the modulation frequency essentially give the nth derivative of the line profile. The detection of the third harmonics makes it possible to verify the hyperfine structure resonance without any background, with a zero crossing of the error signal at the line center.

This method expediently allows direct modulation of the laser. In the case of a Nd:YAG laser at twice the frequency, the modulation can be applied to the Nd:YAG crystal directly by means of piezoceramic. However, as in the case of the other methods, external frequency modulation by means of electrooptical modulators or acoustooptical modulators is also possible.

The known stabilization of laser frequencies with the aid of absorption lines for molecules results in the problem that there are a large number of absorption lines, each having numerous hyperfine components, in the tuning range of the laser. In principle, any of these hyperfine components can be used for stabilization. For an iodine-stabilized Nd:YAG laser at twice the frequency, there are about 10 to 15 iodine absorption lines, each having 15 or 21 hyperfine components, within the range of 60 GHz around the wavelength of 532 nm. The absolute frequency of one component and the frequency separation of any desired component from the adjacent component are normally known accurately. For the quoted example, the absolute frequency of the a10 component of the iodine line P (54)—34-0 was measured, for example, in the spectral band of interest, and the frequency separations were determined relative to this line. This results in a frequency grating with about 240 hyperfine components, to which a laser can be stabilized. Each of these components has a unique frequency separation from the adjacent line, and a specific known signal strength.

In order to produce an absolute laser frequency norm, it is necessary to ensure that the laser is set to and stabilized at a unique hyperfine component of the absorption material. In this case, it is necessary to ensure that the stabilized laser remains stabilized at this line, and only at this line, over a relatively long time period as well.

In order to carry out the tuning to a desired hyperfine component of the absorption material, the laser is in the known technology tuned over the entire frequency range. In this case, the known pattern of the frequency separations, the number of resonances and of the associated signal strengths is used to identify the absorption line uniquely. The stabilization at the desired transition is then carried out by successively reducing the frequency range that is covered and by manual or fine tuning of the laser.

Automatic methods for laser stabilization use the counting-down of the lines as the only criterion. These methods still frequently result in incorrect stabilizations, so that permanent monitoring is necessary. The operation of iodine-stabilized lasers thus still requires highly qualified personnel, who manually stabilize the lasers based on knowledge of the frequency pattern and are able to identify a random jump in the laser frequency to an adjacent component in good time. Furthermore, repeated checking to determine whether the laser is still operating at the desired transition frequency can be achieved only by interrupting the stabilization algorithm and by repeated pattern recognition, or with the aid of a second stabilized laser and a difference-frequency measurement, or a sufficiently accurate wavelength measurement. In any case, expensive and complicated accessories are then required.

It is known from Galzerano et al. in Applied Optics Vol. 38, pages 6962–6966 (1999) for the frequency spectrum of iodine to be measured accurately by using two lasers which each detect one absorption frequency of the iodine in a conventional manner. Lasers are set to different modulation frequencies, with the modulation frequencies of the two lasers being fixed relative to one another. If absorption is now detected in the conventional manner, the frequency separation can be determined accurately from the selected frequency separation of the modulation frequencies. The arrangement of the two lasers is thus used to determine the accurate hyperfine frequencies of iodine (see Table 1) on the basis of conventional frequency stabilization by means of a chosen spectral line in the hyperfine structure.

The invention is based on the problem of allowing the desired absorption line to be determined automatically, so that regulation of the frequency-stabilized laser and reliable long-term stabilization of the laser at this absorption line can be achieved automatically.

In order to solve this problem according to the invention, a method of the type mentioned initially is characterized in that the laser beam is modulated at a second sideband frequency at a known separation, which is defined by a frequency generator, from the laser frequency, in that the absorption of the second sideband frequency in the absorption material is checked at least at times, and in that, when no absorption is found for the second sideband frequency, the laser frequency is tuned until absorption is found both at the laser frequency and at the second sideband frequency.

A frequency-stabilized laser arrangement of the type mentioned initially is suitable for carrying out this method and, according to the invention, is characterized by a second modulation device for generation of at least one second sideband frequency for the same laser beam whose separation from the laser frequency can be set in a defined manner and is considerably greater than the separation of the first sideband frequency, and by a detection device for detection of absorption of the second sideband frequency in the absorption material.

According to the invention, the laser beam is modulated at a second sideband frequency, whose separation from the laser frequency can be predetermined in a defined manner by setting the frequency of a frequency generator. The frequency generator, which is preferably designed to be adjustable, is in this case set to a frequency which corresponds to the separation between an adjacent absorption line and the desired absorption line at which the laser frequency is intended to be stabilized. While the first sideband frequencies which are modulated in a known manner for frequency stabilization are within twice the bandwidth of the absorption line and are used for detection of an absorption of a pump beam in the absorption material by means of an analysis beam, the separation of the second sideband frequency which is generated by the second modulation device is chosen such that it corresponds to the separation between the absorption line that is intended to be used for frequency stabilization and an adjacent absorption line in the absorption material. Since this separation between two absorption lines occurs only once in the absorption material, this separation can be used to determine the regulation of the laser at the desired absorption line uniquely when it is found, according to the invention, that both the laser frequency and the second sideband frequency are absorbed in the absorption material. The important factor in this case is that, according to the invention, the frequency stabilization of the laser frequency is not interrupted by checking the absorption of the second sideband frequency in the absorption material.

In one preferred embodiment of the invention, the second modulation device is switched on and off periodically. If the absorption condition for the second sideband frequency in the absorption material is satisfied, the regulation signal is interfered with briefly during switching on and off, so that signal spikes occur in synchronism with the switching on and off in the error signal, thus indicating that absorption is also taking place at the second sideband frequency, that is to say the frequency of the laser is still stabilized at the desired laser frequency.

The invention is thus based on the idea that the separation of an adjacent absorption line is known for a specific absorption line on which the frequency of the laser is intended to be stabilized. By adjusting this frequency separation by means of the frequency generator for the second modulation device, the second sideband frequency is produced such that it has the same separation from the laser frequency which is equal to the separation between the desired absorption line and the adjacent absorption line. By checking whether absorption is taking place in the absorption material for both the laser frequency and for the second sideband frequency, it is possible to confirm whether the laser frequency is stabilized at the desired absorption line, to be precise when the frequency regulation device is tuned for the first time and for continuous checking (periodically or non-periodically) to determine whether the regulation is still taking place at the desired absorption line, or has jumped to a different absorption line as a result of external processes. The stabilization algorithm for frequency stabilization of the laser is thus not disturbed.

The invention will be explained in more detail in the following text with reference to exemplary embodiments which are illustrated in the drawing, in which:

FIG. 1 shows a schematic circuit diagram of a frequency-stabilized laser arrangement according to a first exemplary embodiment of the invention, FIG. 2 shows a schematic circuit diagram of a frequency-stabilized laser arrangement according to a second exemplary embodiment of the invention, and FIG. 3 shows a flowchart to illustrate the method according to the invention for regulation of the laser frequency at a predetermined, desired absorption line.

In the exemplary embodiment illustrated in FIG. 1, a laser beam 1 from a laser 2 passes through conventional imaging optics 3 and, for the purpose of outputting a useful beam 4 by means of a beam splitter 5, passes through two λ/2 plates 6, 6' on both sides of the beam splitter 5, by means of which the polarization plane of the laser beam 1 can be rotated. The laser beam 1 is then split in a beam-splitter 7 into a pump beam 8 and an analysis beam 9.

As is known for phase modulation spectroscopy, the analysis beam 9 and the frequency $V_O$ are modulated with two sidebands $V_O+V_{RF}$ and $V_O-V_{RF}$ by means of an electrooptical modulator (EOM) 10. To do this, the EOM 10 is driven by a radio-frequency oscillator 11 and a radio-frequency amplifier 12. The modulation frequency at which the EOM 10 modulates the laser frequency $V_O$ is typically not above 10 MHz. The analysis beam 9 which is provided with the two first sidebands $V_O+V_{RF}$ and $V_0-V_{RF}$ passes through an absorption cell 13, which contains absorption material, after being deflected by means of reflectors 14.

The pump beam 8 is modulated at low frequency in a known manner with the aid of an acoustooptical modulator (AOM) 15, in order to eliminate 1/f noise in a known manner. The pump beam 8 is passed via a λ/2 plate and a beam splitter 17 to the absorption cell 13 such that it passes through the absorption cell 13 in the opposite direction to the analysis beam 9, but aligned with it.

The analysis beam is passed via the beam splitter 17 to a photodetector 18, which converts the optical signal to an electrical signal, and supplies it to a double-balanced mixer 19. The output signal from the radio-frequency oscillator 11 is passed to the second input of this mixer 19 via a phase shifter 20. The output signal from the double-balanced mixer 19 is passed to a power splitter 21, and can thus be observed. A subsequent synchronous detector 22, which is clocked by a low-frequency source 23 which feeds the AOM 15, carries out phase-sensitive detection and produces a control signal for a downstream PI regulator 24, which produces two output signals, namely a slow control signal which acts on the temperature control 25 for the laser 2, and a control signal for fast control via a piezo-element 26 of the laser 2, which in this case is in the form of a semiconductor laser (Nd:YAG).

While the arrangement described so far shows the conventional structure of, for example, an iodine-stabilized Nd:YAG laser 2, a modulation device 27 is provided according to the invention for modulation of the analysis beam 9, by means of which modulation device 27 the analysis beam 9 is modulated with a second sideband frequency $V_{FG}$ by means of a second electrooptical modulator 28. For this purpose, the EOM 28 is driven by a frequency generator 29 at the frequency $V_{FG}$ via a double-balanced mixer 30 and an amplifier 31. The second input of the double-balanced mixer 30 in this exemplary embodiment receives a periodic on/off signal 32, by means of which the modulation at the second sideband frequency $V_{FG}$ is switched on and off at the low frequency and periodically. The modulation frequency $V_{FG}$ of the frequency generator 29 is typically in the order of magnitude of 250 MHz, and is set or can be set with respect to an adjacent absorption line in a defined manner corresponding to the separation of one absorption line of the absorption material in the absorption cell 13, at which the frequency of the laser 2 is intended to be stabilized.

The confirmation of absorption of the laser frequency $V_0$ in the absorption material of the absorption cell 13 is based on the fact that, without absorption, the amplitudes of the first sidebands $V_O+V_{RF}$ and $V_O-V_{RF}$ as detected in the photodetector 18 cancel one another out, so that no signal is detected. However, if the relevant frequency transition of the absorption material in the absorption cell 13 is already saturated by the pump beam 8, that is to say absorption has taken place at the frequency $V_O$, the sidebands experience unequal absorption and phase shifts, so that a resultant detector signal is produced. A dispersion signal is produced in phase with the applied modulation frequency, and an absorption signal is produced, phase-shifted through 90°. The dispersion signal is used as a discriminator signal for frequency regulation. The known method for phase modulation spectroscopy allows shot-noise limiting, quantumlimited detection of the signals, and at the same time avoids the disturbing modulation of the laser frequency with the useful beam.

If the second sideband frequency that is produced according to the invention at the separation $V_{FG}$ from the laser frequency $V_O$ is absorbed in the absorption material in the absorption cell 13, this disturbs the error signal. Spikes occur in the error signal in time with the switching on and off by means of the signal 32, and these indicate that absorption of the second sideband frequency is taking place in the material of the absorption cell 13. This is an indicator signal that the frequency of the laser 2 is being stabilized at the "correct" desired absorption line of the absorption material in the absorption cell 13.

In the exemplary embodiment illustrated in FIG. 2, identical parts are provided with identical reference symbols. The description is restricted to explaining the differences from the first exemplary embodiment as illustrated in FIG. 1.

In the second exemplary embodiment, which is illustrated in FIG. 2, the EOM 28 for producing the modulation at the second sideband frequency $V_{FG}$ is located upstream of the beam splitter 7, which splits the laser beam 1 into the pump beam 8' and the analysis beam 9'. Accordingly, in addition to the laser frequency $V_O$, the pump beam 8' already includes the second sideband at the frequency $V_O + V_{FG}$, and passes through the absorption cell 13 in this form. The EOM 10 acts in the conventional manner only on the analysis beam 9', and produces the near sidebands at the frequency $V \pm V_{RF}$. In order to detect the adjacent lines, the frequency generator 29 which drives the EOM 28 is designed to be variable, so that it is possible to capture the respective adjacent line and to determine its separation from the main line, to which the laser is currently stabilized. It is, of course, also possible in the first exemplary embodiment as illustrated in FIG. 1 to carry out such a determination process by variation of the frequency of the frequency generator 29 and by detection of the resonance in the manner described above.

One method for setting the stabilized laser arrangement to a desired absorption line in the hyperfine structure, for example of gaseous iodine, is illustrated on the basis of a flowchart in FIG. 3.

In a first step 41, a hyperfine structure line $V_O$ is chosen, to which the laser beam 1 is intended to be stabilized. This hyperfine structure line $V_O$ has a defined separation from an adjacent line $V_{nn}$. The distances between the lines in the hyperfine structure may, for example, be stored in a table.

In a next step 42, the frequency $V_L$ of the laser 2 is adjusted until a first resonance is found with the aid of the absorption cell 13. The laser frequency is stabilized at this absorption line $V_X$ in the step 43.

By presetting the desired separation from the next adjacent line, it is possible to check whether the randomly found resonance line $V_X$ is, in fact, the desired hyperfine structure line $V_O$ (comparison step 44). If this is the case, the stabilization loop is closed with the steps 43 and 44, with the check as to whether the laser is still stabilized at the correct line being controlled by the signal 32 for switching on and off.

If the first line $V_X$ that is found is not yet the desired hyperfine structure line $V_O$, the separation from the next adjacent line can now be determined by adjusting the frequency of the frequency generator 29 in order in this way to determine the absolute frequency of the resonance line $V_X$ that has been found in step 45 by determining the frequency separation from the adjacent resonance line. Since the resonance line at which the laser is currently stabilized is now known, it is possible to determine not only the adjustment direction but also the extent of adjustment of the laser frequency $V_L$ to the desired absorption line $V_O$, and the corresponding adjustment is carried out in the step 46. Steps 43 and 44 are then carried out for stabilization at the desired absorption line $V_O$, and continuous checking to determine whether this stabilization is still maintained.

Thus both the regulation at the desired resonance line $V_O$ and the long-term stabilization are carried out in the described manner, by continuous checking as to whether the laser is still stabilized at the correct resonance line.

The invention claimed is:

1. A method for checking the regulation state, with respect to a desired laser frequency $V_0$, of a frequency-stabilized laser, comprising:
   providing a laser, tunable within a given tuning range;
   generating a laser beam at a frequency $V_L$ using said laser;
   modulating said laser beam at at least one first sideband frequency $V_{RF}$;
   modulating said laser beam at a second sideband frequency $V_{FG}$ at a known separation, which is defined by a frequency generator, from said desired laser frequency $V_0$;
   passing the laser beam, modulated at said at least one first sideband frequency $V_{RF}$ and at said second sideband frequency $V_{FG}$, through an absorption material which has two or more absorption lines in said tuning range of the laser, said absorption lines being at different intervals from one another, with the laser frequency $V_L$;
   measuring the absorption of the second sideband frequency $V_O + V_{FG}$ in the absorption material at successive times; and
   in response to said measuring determining no absorption for the second sideband frequency, tuning the laser frequency $V_L$ until said measuring determines absorption both at the laser frequency $V_0$ and at the second sideband frequency $V_O + V_{FG}$.

2. A frequency stabilizing laser system, comprising:
   a tunable laser for generating a laserbeam, at a frequency $V_L$ tunable over a given tuning range;
   a first modulator for modulating said laserbeam to have at least a first sideband frequency $V_O \pm V_{RF}$;
   a second modulator for modulating said laserbeam to have generation of at least one second sideband frequency $V_O \pm V_{FG}$, wherein the separation $V_{FG}$ from the laser frequency $V_O$ is considerably greater than the separation $V_{RF}$ of the first sideband frequency $V_O \pm V_{RF}$;
   an absorption material, arranged in a path of the modulated laser beam, having two or more absorption lines in said tuning range of the laser, the absorption lines having different separations between them;
   a detector for detecting absorption, in the absorption material, of the laser at an absorption line at the $V_O$ frequency and at the second sideband frequency $V_0 \pm V_{FG}$, and for generating a tuning signal in response; and
   a tuning device for tuning, based on said tuning signal, the laser frequency $V_L$.

3. The frequency-stabilized system of claim 2, further comprising a switching device for switching the second modulator on and off.

4. The frequency-stabilized system of claim 2, wherein the laser is a Nd:YAG laser.

5. The frequency-stabilized system of claim 2, wherein the laser is a Nd:YAG laser at twice the frequency.

6. The frequency-stabilized system of claim 2, wherein the absorption material is iodine in gaseous form.

* * * * *